United States Patent
Tsai et al.

(10) Patent No.: US 7,324,619 B2
(45) Date of Patent: Jan. 29, 2008

(54) METHOD AND APPARATUS FOR AUTO-TRACKING AND COMPENSATING CLOCK FREQUENCY

(75) Inventors: Wen-Fu Tsai, Kaohsiung (TW); Chien-Chih Lin, Taipei (TW); Shih-Chieh Chang, Taipei (TW)

(73) Assignee: Genesys Logic, Inc., Taipei (TW)

( * ) Notice: Subject to any disclaimer, the term of this patent is extended or adjusted under 35 U.S.C. 154(b) by 653 days.

(21) Appl. No.: 10/859,104

(22) Filed: Jun. 3, 2004

(65) Prior Publication Data

US 2005/0271168 A1     Dec. 8, 2005

(30) Foreign Application Priority Data

May 23, 2003    (TW) ................................ 92113930 A

(51) Int. Cl.
*H04L 7/00* (2006.01)
(52) U.S. Cl. .................................... 375/368
(58) Field of Classification Search ................ 375/316, 375/326, 327, 344, 346, 354, 355, 358–368
See application file for complete search history.

(56) References Cited

U.S. PATENT DOCUMENTS

| | | | | |
|---|---|---|---|---|
| 5,400,369 A | * | 3/1995 | Ikemura | 375/368 |
| 5,668,840 A | * | 9/1997 | Takano | 375/368 |
| 6,487,238 B1 | * | 11/2002 | Kamo | 375/150 |
| 2001/0033629 A1 | * | 10/2001 | Ito | 375/368 |
| 2006/0021491 A1 | * | 2/2006 | Greco et al. | 84/293 |

* cited by examiner

Primary Examiner—Don N. Vo
(74) Attorney, Agent, or Firm—Rosenberg, Klein & Lee

(57) ABSTRACT

A method and an apparatus for auto-tracking and compensating a clock frequency are disclosed. The method is suitable for being applied in USB controllers. The apparatus for receiving a data stream includes an oscillator, for generating a sampling clock; a clock extractor, for extracting a system clock according to the data stream and the sampling clock; a pattern extractor, coupled to the clock extractor to extract a plurality of patterns from the data stream according to the system clock; a counter coupled to the pattern extractor for counting the length of the data stream and generating a counting value, according to the sampling clock, in response to the patterns; an arithmetic logic unit (ALU), coupled to the counter and the pattern extractor for mapping a configuration according to the counting value and a reference value; and a register, coupled to the ALU and the oscillator to temporarily store the configuration and feedback the configuration to the ALU, so that the oscillator updates the frequency of the sampling clock in response to the configuration.

20 Claims, 4 Drawing Sheets

METHOD AND APPARATUS FOR AUTO-TRACKING AND COMPENSATING CLOCK FREQUENCY

BACKGROUND OF THE INVENTION

1. Field of the Invention

The present invention relates to a method and an apparatus for auto-tracking and compensating the clock frequency and, more particularly, to a method and an apparatus for auto-tracking and compensating the clock frequency for the USB (Universal Serial Bus) peripheral.

2. The Related Arts

The USB ports of a computer are capable of plugging a plurality of USB peripherals, including USB keyboard, USB mouse, USB card reader, USB flash drive, external USB hard disk, USB printer, and USB scanner, etc, so as to facilitate the users. The transmission speed of USB has also evolved from the 1.5 Mbps or 12 Mbps of USB 1.1 to the recent 480 Mbps of USB 2.0.

According to the specification of the USB, USB 1.1 can support low speed peripherals, such as USB keyboard, USB mouse, and USB joy stick, whose transmission speed is 1.5 Mbps with the tolerance of 1.5%, and the full speed peripherals, such as USB flash drive, USB printer, and USB scanner, whose transmission speed is 12 Mbps with a tolerance of 0.25%. On the other hand, USB 2.0 is capable of supporting high speed peripherals, whose transmission speed is as high as 480 Mbps. USB 2.0 is downward compatible with the USB1.1, and therefore, USB 2.0 can support low speed, full speed and high speed peripherals.

FIG. 1 of the attached drawings shows a block diagram of a conventional USB low speed controller. The USB low speed controller 100 normally requires an external precise crystal oscillator 120, or a ceramic resonator, and external large-capacitance capacitors C1 and C2 to cooperate with its internal oscillating auxiliary circuit 101 to generate the CLK clock signal for the internal clock extracting circuit 102 inside the low speed controller 100. For example, the CLK clock frequency is 6 MHz, which is the four times (4×) sampling frequency for USB low speed. The crystal oscillator can be oscillated at 1.5 MHz clock frequency and 6 MHz of 4× sampling frequency is obtained by frequency-multiplying the same utilizing a phase lock loop (PLL). The transceiver 101 is coupled to the USB port of the host. The transceiver 104 receives a data stream through a differential signal pair of D+/D−. When the transceiver 104 receives the differential signal D+/D− from the host, it outputs the differential signal RXD+/RXD− and associated NRZI-coded RXD data signal to the serial interface engine (SIE) 106. The NRZI-coded RXD data is also transmitted to the clock extracting circuit 102. The clock extracting circuit 102 uses the CLK clock to oversample the RXD data, and extract the 1.5 MHz SIECLK clock inherent in the differential signal to operate the SIE 106. The SIE 106 uses the SIECLK clock to recover the RXD data signal to the digital signal. Alternatively, the transceiver 104 receives the differential signal TXD+/TXD− from the SIE 106, and transmits the signal to the host, wherein SIE 106 also controls the transceiver 104. The external crystal oscillator or the ceramic resonator is a considerable expense for the USB mouse manufacturers.

The USB specification includes several types of packets to facilitate all types of transactions. FIG. 2 shows the data format of a token packet 200. The token packet 200 comprises a PID field 220, an ADDR field 240, an ENDP field 260, and a CRC5 field 280. Typically, the width of the PID field 220 is 8 bits, for indicating the packet format, such as, IN, OUT, or SETUP packet. The ADDR field 240 and the ENDP field 260 uniquely indicate the endpoint address. The CRC5 field 280 is a 5-bit cyclic redundant code. The host can use the token packet 200 to inform the endpoint whether a read or a write transaction is performed. If it is a write transaction, the host will send data packets to the endpoint. If read transaction, the endpoint will send data packets to the host.

SUMMARY OF THE INVENTION

The present invention discloses an apparatus for auto-tracking and compensating a clock frequency, suitable for used in USB. controllers. The apparatus for receiving a data stream comprises an oscillator, for generating a sampling clock;, a clock extractor, for extracting a system clock according to the data stream and the sampling clock; a pattern extractor, coupled to the clock extractor to extract a plurality of patterns from the data stream according to the system clock; a counter coupled to the pattern extractor for counting the length of the data stream and generating a counting value in response to the patterns according to the sampling clock; an arithmetic logic unit (ALU), coupled to the counter and the pattern extractor for mapping a configuration according to the counting value and a reference value; and a register, coupled to the ALU and the oscillator to temporarily store the configuration and feedback the configuration to the ALU, so that the oscillator updates the frequency of the sampling clock in response to the configuration.

The present invention also discloses a method for auto-tracking and compensating a clock frequency, suitable for USB controllers. The method for receiving a data stream comprises the steps of: generating a clock signal and a sampling signal corresponding to the data stream , with the first frequency and the second frequency, respectively, where the second frequency is higher than the first frequency; extracting a plurality of patterns from the data stream according to the first frequency; counting the length of the data stream and generating a counting value in response to the extracted patterns; mapping a configuration according to the counting value and a reference value; and compensating the first frequency according to the configuration.

The present invention further discloses a clock frequency compensation apparatus, comprising an oscillator for generating clock signals, a non-volatile memory, a register, a multiplexer, and a frequency compensation circuit, wherein the multiplexer has two inputs and an output, and the inputs are coupled to the non-volatile memory and the register, while the output is coupled to the oscillator. The multiplexer alternatively selects the non-volatile memory and the register to output an n-bit configuration. The frequency compensation circuit is coupled to the oscillator to generate an m-bit configuration according to a token packet. Both n and m are positive integers. The oscillator adjusts the frequency of the clock signal according to the n-bit and m-bit configurations.

These and other objects, features and advantages of the invention will be apparent to those skilled in the art, according to the disclosure of the drawings, the detailed description of the preferred embodiment, and the appended claims.

DETAILED DESCRIPTION OF THE PREFERRED EMBODIMENT

Figure 1:
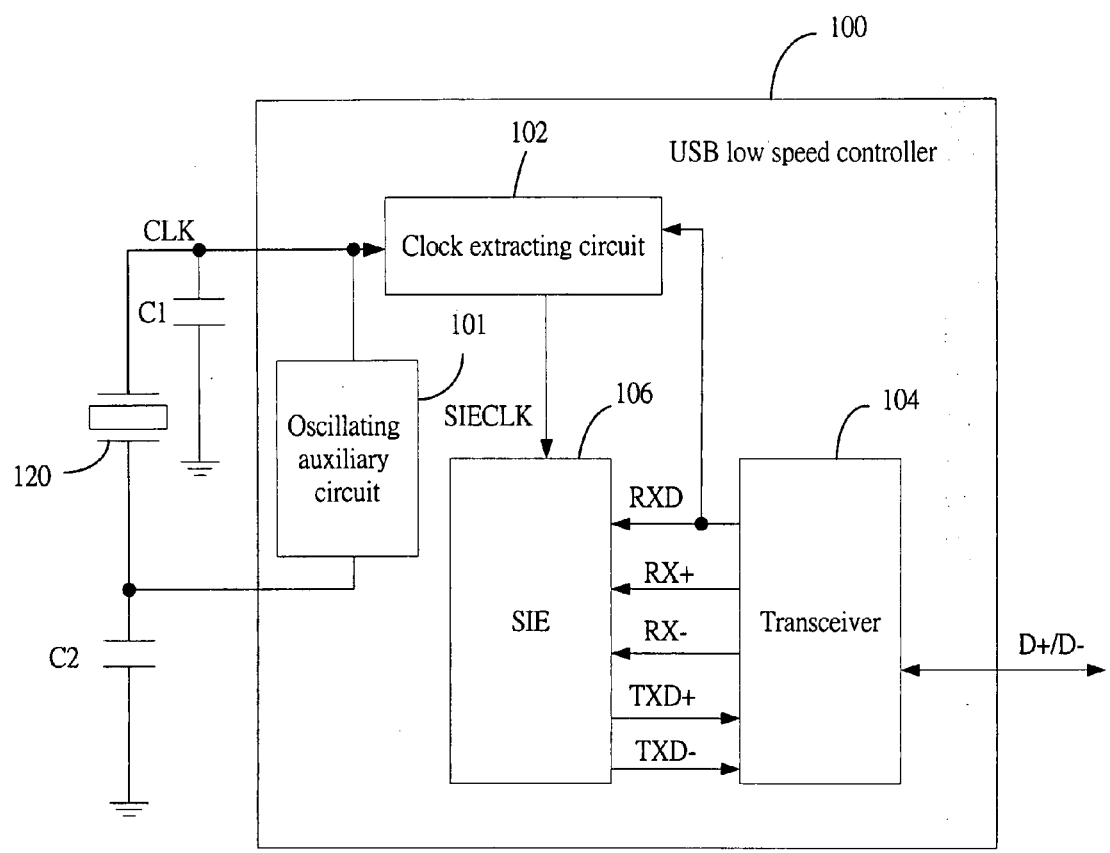
FIG. 1 shows a block diagram of a conventional USB controller.
Figure 2:
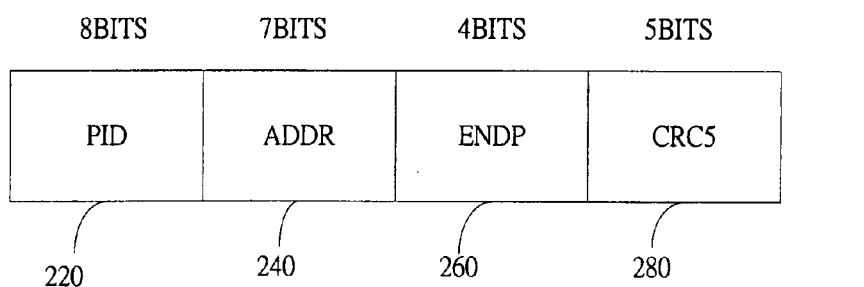
FIG. 2 shows the format of a token packet.
Figure 3:
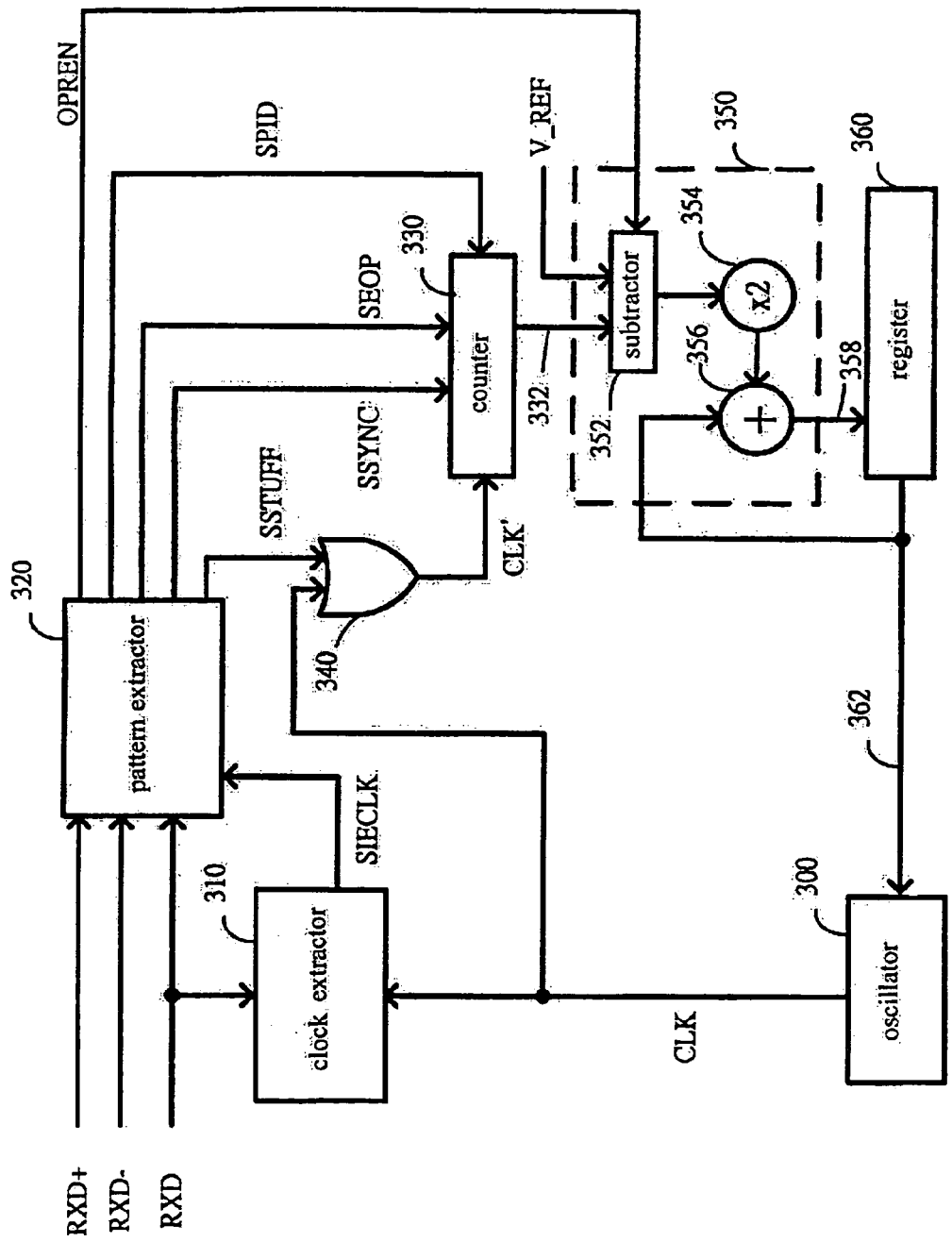
FIG. 3 shows a block diagram of the apparatus for auto-tracking and compensating the frequency according to one embodiment of the present invention.

FIG. 3 shows a block diagram of a circuit for auto-tracking clock frequency of a USB peripherals device in accordance with an embodiment of the present invention, which is suitable for being integrated into the IC (Integrated Circuit) chip. The oscillator 300 generates CLK signals for the clock extractor 310. The oscillator 300 may comprise resistors, inverters and capacitors. Therefore, the CLK signals deviates the desired clock frequency due to the manufacturing process factor variation. The present invention is capable of compensating the undesired deviation of CLK signal. This embodiment is exemplified by a low speed USB control IC, wherein the CLK frequency is centered at about 6 MHz, which is four times of the transmission frequency. The clock extractor 310 retrieves the clock signal SIECLK associated with data stream according to the NRZI-coded RXD data signal and the CLK signal. The SIECLK is about 1.5 MHz. The pattern extractor 320, according to the SIECLK signal, identifies patterns of the data stream from the host. In this embodiment, the transceiver (not shown) generates the RXD+/RXD− differential data signal and the NRZI-coded RXD data signals from the data stream.

Every packet on the USB cable includes a synchronization (SYNC) field, and an end-of-packet (EOP) field at the packet end to indicate transmission end. In general, the USB protocol communicates with the differential signal, but the EOP filed requires the D+ and D− to drive the USB cable to a low level for a duration of one bit time, or longer, and then the "J" state. For USB protocol, NRZI code is applied, wherein a transition occurs when the data is "0", otherwise staying at the same level. In addition, according to USB protocol, one "0" is inserted when a series of six continuous "1"s appear in the data, in order to force the transition, and avoid the baseline wander effect. This is the so-called bit stuffing. When the host sends the packets to the peripherals, the pattern extractor 320 identifies the SYNC field, the PID field, and the EOP field according to the SIECLK signals, and uses the SSYNC, the SPID, and the SEOP signals to control the start, termination, and reset of the counter 330. In this preferred embodiment, when the pattern extractor 320 detects the bit stuffing, the pattern extractor 320 asserts the SSTUFF signal for bit masking the CLK signal as CLK' signal. The counter 330 is triggered by the CLK' signal, so as to compensate the sampling error caused by the bit stuffing. In this embodiment, the CLK signal and the SSTUFF signal are input to an OR-gate 340 for generating the CLK' signal. By masking the CLK signal, the transition of CLK signal caused by bit-stuffing is suppressed. Therefore, no matter bit stuffing exists in the token packet, the present invention is capable of auto-tacking and compensating.

The counting result generated by the counter 330 is provided by the signal 332 to the ALU 350 for mapping. The pattern extractor 320 may enable the ALU 350 for calculation by observing the token packet and asserting the OPREN signal. For example, the ALU 350 compares the result with a reference value V_REF to identify the deviation of the clock frequency generated by the oscillator 300. Then, the arithmetic result of the ALU 350 is sent to the register 360 through the signal 358. The register 360 configures the oscillator 300 through the signal 362 in response to the signal 358, so as to achieve auto-tracking and compensating the clock CLK. The frequency configuration of the oscillator can be non-linear. In this embodiment, the ALU 350 comprises a subtractor 352, a multiplier (×2) 354, and an adder 356 for simple linear mapping, wherein the slope is 2. Therefore, the ALU uses an approximate linear function to estimate the non-linear relationship, in order to reduce the hardware gate count of the ALU 350. In addition, the hardware of an ×2 multiplier can be implemented by the shift register. The register 360 feedbacks the adder 356 with the signal 362 to provide the USB low speed control IC with an initial configuration value, so that the oscillator 300 can generate an initial output clock frequency when the IC starts operation.

Figure 4:
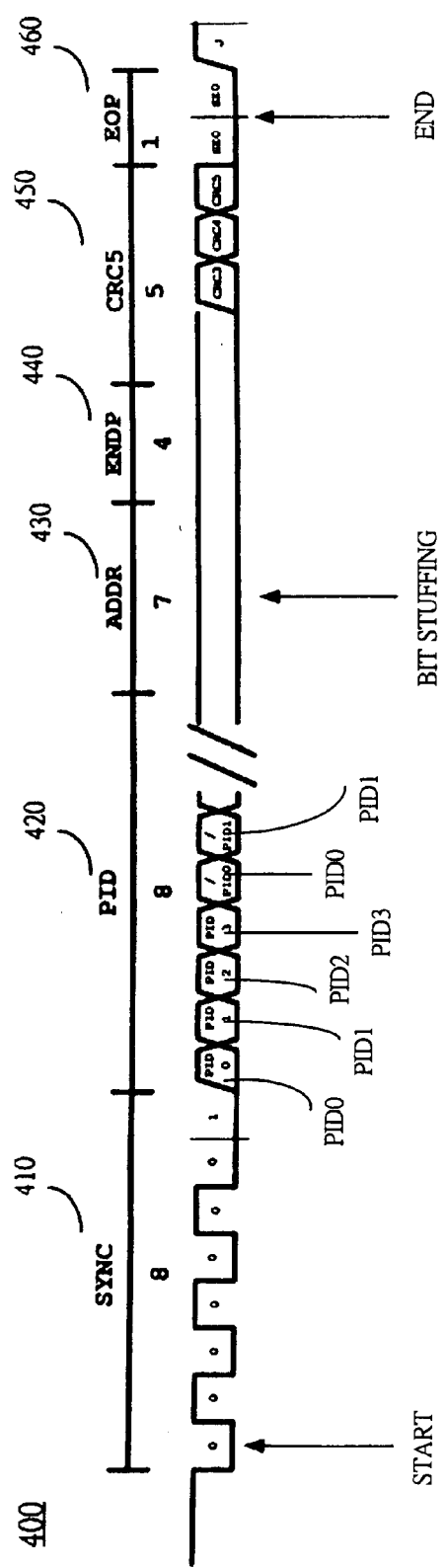
FIG. 4 shows physical waveform of a token packet.

FIG. 4 shows the transmission waveform of an NRZI-coded token packet on a USB cable. The data stream 400 comprises a SYNC field 410, a PID field 420, an ADDR field 430, an ENDP field 440, a CRC5 field 450, and an EOP field 460. Disregarding bit stuffing, the width of each field is 8, 8, 7, 4, 5, and 1, respectively. The USB cable comprises a D+, a D−, a PWR and a GND signal line. The D+ and D− signal lines transceive the differential signal, and the PWR and GND are capable of supplying 500 mA power to the endpoint. The EOP field 460 is represented by driving low on both of the D+ and D− lines, SE0, for at least one bit time duration. It is not a standard NRZI code, but the USB specification defines that the EOP field 460 should not be less than the duration of a bit, i.e., a bit time. In the embodiment shown in FIG. 3, the ideal CLK frequency is 6 MHz for a USB low speed control IC with 4× oversampling rate, and the extracted SIECLK is 1.5 MHz. Ideally, the rising edge of the SIECLK signals shall precisely appear at the center of each bit time. Therefore, when the pattern extractor 320 retrieves the first NRZI-coded "0" of the SYNC field 410, the rising edge of the SIECLK signal should be at the center, i.e., the center of the first NRZI-coded "0" of the SYNC field 410 indicates the starting point of the entire token packet 400. When the low level SE0 of the EOP field 460 is encountered and stays for one bit time, the end of the packet is identified. Assume no bit stuffing, and the sampling and the counting is performed with a precise four multiple (4×) oversampling clock CLK, thus the ideal counting result should be 130 (=32.5×4).

Consider the worst case: both the starting point and the end point shift half of a bit time in the reverse direction. In addition, bit stuffing occurs, so masking CLK results in 0.25 bit time counting error. In this case, the total error is:

$$(\pm)1.25 \text{ bit time}/32.5 \text{ bit time} \cong (\pm) 3.85\%,$$

wherein (±) 3.85% is treated as an inherent error, representing the adjustable frequency range and the error tolerance of the USB low speed transmission under USB 1.1 specification is 1.5%. Assume that the adjustable frequency range is indicated by Δf, then:

$$(\pm)3.85\% * \Delta f < (\pm 1.5\%) * 6 \text{ MHz}$$

That is, (Δf/6 MHz)*(±3.85%) should be less than (±1.5%), so the maximum adjustable frequency range $\Delta f_{max}$ is about 2.34 MHz.

Assume that the embedded oscillator 300, due to the variation of manufacturing process, has a clock frequency ranging from 5.5 MHz to 6.5 MHz, i.e., the adjustable frequency range Δf is 1 MHz, the corresponding inherent error of the worst case is:

(1 MHz/6 MHz)*(±3.85%)≈±0.64%

Because the error tolerance of the USB low speed transmission is 1.5%, the CLK signal can tolerate 0.86% (=1.5%–0.64%) after the adjustment. In other words, if the CLK signal locates within the range of 0.86% of 6 MHz, it meets the USB specification:

6 MHz*(±0.86%)=±51.6 KHz

During the adjustment, the frequency step $f_{step}$ is 103.2 KHz to guarantee that the CLK signal can be adjusted back to locate within the range of 0.86% of the 6 MHz. Therefore, even in the worst case, the USB low speed control IC can guarantee to operate normally to meet the error tolerance of the USB low speed transmission specification. When designing a USB low speed control IC, it only requires specifying the frequency range of the built-in oscillator 300 and the frequency step $f_{step}$, so that the present invention is capable of compensating the clock frequency according to the token packet, without requiring any external crystal oscillator. In this embodiment, the initial frequency of the oscillator 300 lies within the range between 5.5 MHz and 6.5 MHz, and the $f_{step}$ is 100 KHz. In this embodiment, 100 adjustment steps are required. A 7-bit register 360 can provide 128 adjustment steps, so the requirement is met. The 100 frequency adjustment steps can be realized, at low costs, through various combinations of resistors and capacitors. For example, because the manufacturing conditions are identical when a die is fabricated, the resistance ratio can be precisely controlled. Also, it should be noted that the oscillating frequency is typically related to R*C, wherein the R indicates the equivalent resistance and C indicates the capacitance. Through properly adjusting the equivalent resistance ratio, the oscillating frequency relationship can be controlled. In other words, the frequency step $f_{step}$ is accurately controlled. Moreover, the register 360 can be either a latch or a flip-flop.

The USB low speed control IC in FIG. 3 is further referenced. Initially, the register 360 provides a default configuration, through signal 362, to the oscillator 300 for initial output frequency. If the register 360 is 8 bits, the register 520 has the value between 0 and FF, with a preferred default value of 7F. The pattern extractor 320 triggers the counter 330 to start counting when observing the first NRZI-coded "0" according to the SIECLK signal. The pattern extractor 320 disables the ALU 350 by deasserting the OPREN signal while the counter 330 is counting for the token packet. When the pattern extractor 320 determines that this packet is not a token packet by observing the PID field, it resets the counter 330 by asserting the SPID signal. Because the ALU 350 is disabled while not a token packet, the current frequency is not changed. When the pattern extractor detects an EOP field 460 by observing SE0 for a bit time, the counter 330 stops counting by asserting SEOP signal, the ALU 350 is enabled by asserting the OPREN signal to perform calculation in response to the counting result from the counter. As mentioned, in this embodiment, the reference value V_REF is 130. According to the previous configuration through the signal 362 and the result of ALU 350, an update configuration for the oscillator 300 is obtained, so that the clock frequency is automatically tracked. To observe the duration of EOP field 460 at SE0, the end point of the counting period is determined by detecting the RXD+ and RXD– differential signal as SE0 in response to the rising edge of the SIECLK signal and consequently detecting SE0 in response to the consequent falling edge of SIECLK.

In the aforementioned embodiment, the RXD+, RXD– differential signal is directly input to the pattern extractor 320. It should be noted that the invention is not to be limited to the disclosed embodiment, but on the contrary, is intended to cover various modifications. Persons skilled in the art may conceive possible amendments without departing from the spirit and scope of the present invention. For example, it can also utilize the NRZI-coded RXD signal or the RXD+, RXD– differential signal to identify the SYNC field 410 and PID field 420 to determine the counting period. Furthermore, the token packet can be identified rapidly by the pattern of "xx01". In other words, as shown in FIG. 4, if the first two bits PID0, PID1 of the PID field are determined as "1" and "0" respectively, by oversampling the packet according to the SIECLK signal, whether the current packet is a token packet is determined. Therefore, even when the oversampling is inaccurate, the present invention can distinguish the PID field efficiently. Whether the current packet is a token packet is determined according to the characteristics of each field. The starting point of the counter in FIG. 4 can be triggered by detecting the RXD+, RXD– differential signal transiting from the "J" state to an NRZI-coded "1". Alternatively, the frequency relationship between the CLK signal and the CLK' signal can be changed. The starting point and the end point of the counting period can be appropriately selected according to IC design, thus slightly affecting the accuracy of the adjustment. According to the disclosure of the present invention, even though the CLK signal suffers 20% deviation, it can still be automatically tracked and adjusted as long as the built-in oscillator 300 is designed with an appropriate frequency step $f_{step}$ and a sufficient number of adjustment steps. Persons skilled in the art should note that the present invention can be also applied to full speed USB peripherals and high speed USB peripherals.

Consider the application of a USB mouse as an example. The environment for this type of portable device varies often, such as the temperature of the hand, and the temperature of the location the control IC, resulting in the oscillator's frequency shift. The present invention improves the clock stability by compensating the frequency utilizing every token packet.

Figure 5:
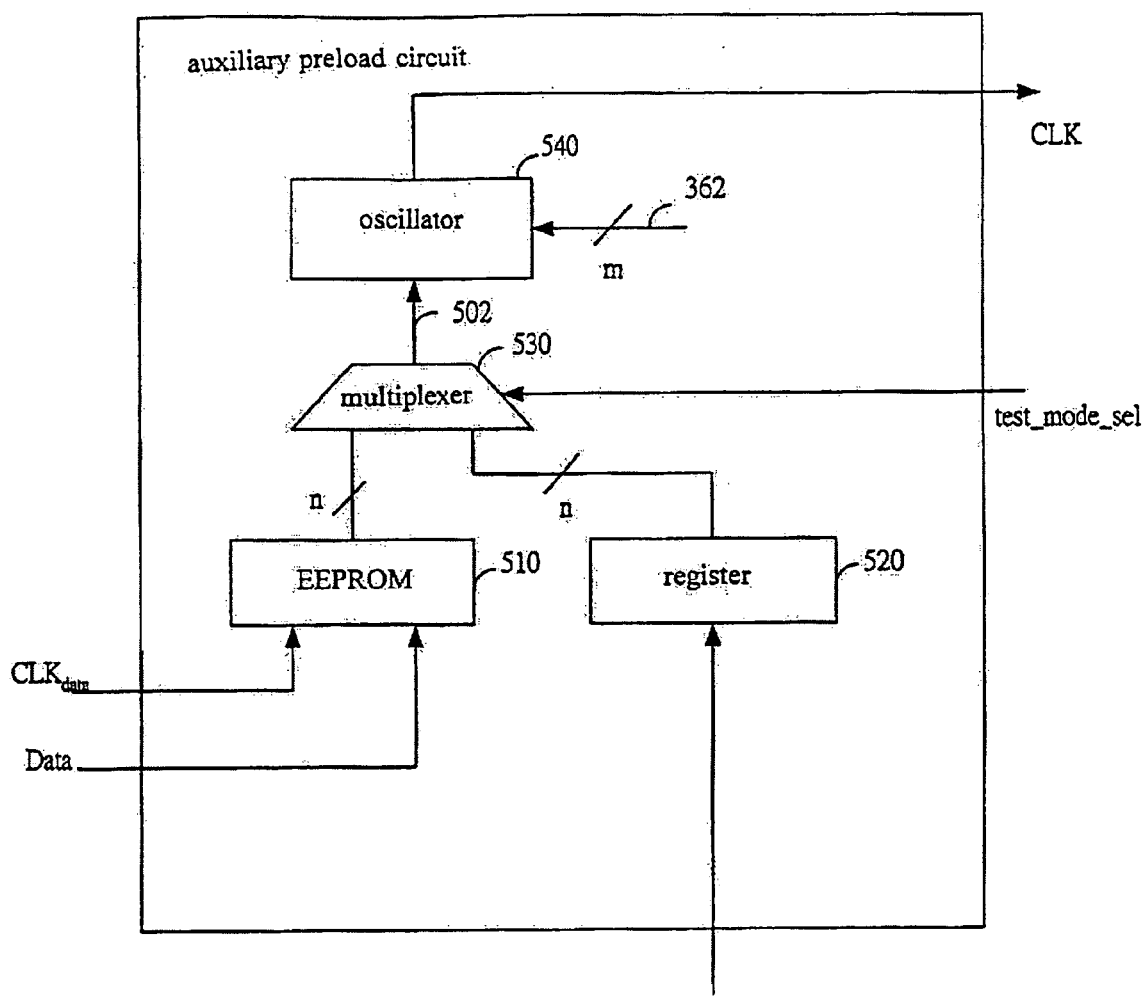
FIG. 5 shows a block diagram of a frequency compensation circuit according to one embodiment of the present invention.

Furthermore, when the frequency deviation exceeds the desired range, the present invention discloses an auxiliary preload circuit for frequency compensation and a method to allow the manufacturers to manually adjust the CLK clock frequency of the USB control IC into the desired range, then the circuit disclosed in FIG. 3 can be applied to perform auto-tracking and compensation for clock signal. FIG. 5 shows the auxiliary preload circuit 500, which can be used in USB control ICs. The auxiliary preload circuit 500 comprises an EEPROM 510, a register 520, a multiplexer 530, and an oscillator 540. An IC may enter the test mode by asserting the test_mode_sel pin of the auxiliary preload circuit 500. The test persons may load a frequency configuration into the register 520. The multiplexer 530, under the test mode, outputs the content of the register 520 to the oscillator 540 through the signal 502. The oscillator 540, according to the configuration, generates the CLK signal. The test persons examine whether the CLK frequency meets the requirement. If not, a new configuration is updated into the register 520 from outside, and the above steps are repeated till the CLK frequency meets the requirement. The test persons may program the EEPROM 510 with a proper configuration through the CLK$_{data}$ and Data pins according to the above preload result. Under the normal mode, the oscillator 540 generates a CLK frequency according to the content of EEPROM. In this embodiment, the register 520 has an n-bit output. If n equals 8, the value of the register 520 may range from 0 to FF. There are m bits output from the register 360 through the signal 362 in FIG. 3. In the test mode, the oscillator 540 generates the CLK signal according to the register 360 and the register 520. Assume that both m and n equals 10. The oscillator 540 can preferably overlap two bits in the register 360 and the register 520 to generate a 2 bytes configuration. Hence, the auto-tracking and compensation circuit partially compensates the manual setting. While the circuit has been described as the above embodiment, it should be understood that various modifications can be made by persons skilled in the art without departing from the spirit of the present invention. For example, under the test mode, preloading a configuration into the register 520 from outside with another multiplexer can be achieved by utilizing the CLK$_{data}$ and Data pins, or alternatively, serial or parallel data input may be adopted.

In summary, the present invention discloses an apparatus for auto-tracking and compensating a clock frequency, suitable for USB controllers. The apparatus for receiving a data stream comprises an oscillator, for generating a sampling clock; a clock extractor, for extracting a system clock according to the data stream and the sampling clock; a pattern extractor, coupled to the clock extractor to extract a plurality of patterns from the data stream according to the system clock; a counter coupled to the pattern extractor for counting the length of the data stream and generating a counting value in response to the patterns according to the sampling clock, an arithmetic logic unit (ALU), connected to the counter and the pattern extractor for mapping a configuration according to the count and references; and a register, coupled to the ALU and the oscillator to temporarily store the configuration and feedback the configuration to the ALU, so that the oscillator updates a frequency of the sampling clock in response to the configuration.

The present invention also discloses a method for auto-tracking and compensating a clock frequency, suitable for USB controllers. The method for receiving a data stream comprises the steps of: generating a clock signal and a sampling signal associated with the data stream, with the first frequency and the second frequency, respectively, where the second frequency is higher than the first frequency; extracting a plurality of patterns from the data stream according to the first frequency; counting the length of the data stream and generating a counting value in response to the extracted patterns; mapping a configuration according to the counting value and a reference value; and compensating the first frequency according to the configuration.

The present invention further discloses a clock frequency compensation apparatus, comprising an oscillator for generating a clock signal, a non-volatile memory, a register, a multiplexer, and a frequency compensation circuit, wherein the multiplexer has two inputs and an output, and the inputs are coupled to the non-volatile memory and the register, while the output is coupled to the oscillator. The multiplexer alternatively selects the non-volatile memory and the register to output an n-bit configuration. The frequency compensation circuit is coupled to the oscillator to generate an m-bit configuration according to a token packet. Both n and m are positive integers. The oscillator adjusts the frequency of the clock signal according to the n-bit and m-bit configurations.

While the invention has been described in connection with what is presently considered to the most practical and preferred embodiment, it is to be understood that the invention is not to be limited to the disclosed embodiment. On the contrary, the description of the embodiment is intended to cover various modifications and equivalent arrangement included within the spirit and scope of the appended claims.

What is claimed is:

1. An apparatus for auto-tracking and compensating a clock frequency, for use in a USB controller to receive a data stream, comprising:
    an oscillator, for generating a sampling clock signal,
    a clock extractor, for generating a system clock signal according to the data stream and the sampling clock signal,
    a pattern extractor, connected to the clock extractor, for extracting a plurality of patterns from the data stream according to the system clock signal,
    a counter, connected to the pattern extractor, for counting a counting value representing a length of the data stream according to the sampling clock signal and the patterns,
    an arithmetic logic unit (ALU), connected to the counter and the pattern extractor, for mapping a configuration according to said counting value and a reference value, and
    a register connected to the ALU and the oscillator, for temporarily storing the configuration and feeding back the configuration to the ALU,
    wherein the oscillator updating a frequency of the sampling clock signal in response to the configuration.

2. The apparatus as claimed in claim 1, wherein the register is a latch.

3. The apparatus as claimed in claim 1, wherein the register is a flip-flop.

4. The apparatus as claimed in claim 1, wherein the oscillator comprises a plurality of resistors and a plurality of capacitors.

5. The apparatus as claimed in claim 1 further comprising a logic gate with two inputs and an output, wherein the inputs are respectively coupled to the sampling clock signal and the pattern extractor to selectively mask the sampling clock signal, and the output is coupled to the counter, so that the counter counts the length of the data stream according to the selectively masked sampling clock signal, and generate said counting value in response to the patterns.

6. The apparatus as claimed in claim 5, wherein the pattern extractor masks the sampling clock signal to stop the counting through identifying a bit stuffing in the data stream.

7. The apparatus as claimed in claim 1, wherein the ALU comprises a subtractor, a shifter, and an adder for linear mapping.

8. The apparatus as claimed in claim 1, wherein the pattern extractor extracts a SYNC field pattern, a PID field pattern, and an EOP field pattern from the data stream.

9. The apparatus as claimed in claim 1, wherein the data stream is a token packet.

10. The apparatus as claimed in claim 1, wherein the pattern extractor extracts an NRZI-coded "0" in the data stream to initiate the counter.

11. The apparatus as claimed in claim 1, wherein the pattern extractor detects a transition from the "J" state to an NRZI-coded "0" in the data stream to initiate the counter.

12. The apparatus as claimed in claim 1, wherein the extractor identifies an EOP field pattern in the data stream to stop the counter.

13. The apparatus as claimed in claim 1, wherein the extractor identifies a PID field pattern in the data stream to selectively reset the counter.

14. The apparatus as claimed in claim 1, wherein the data stream meets the USB low speed transmission specification.

15. A method for auto-tracking and compensating a clock frequency, used in a USB controller to receive a data stream, the method comprising the steps of:

generating a clock signal and a sampling clock signal associated with the data stream, with a first frequency and a second frequency, respectively, where the second frequency is higher than the first frequency, extracting a plurality of patterns from the data stream according to the first frequency, counting the length of the data stream according to the sampling clock signal and generating a counting value in response to said patterns, mapping a configuration according to the counting value and a reference value, and compensating the first frequency according to the configuration.

16. The method as claimed in claim 15, wherein said mapping step performs a linear mapping according to the counting value and the reference value.

17. The method as claimed in claim 15, wherein the data stream is a token packet.

18. The method as claimed in claim 15, wherein said extracting step extracts a SYNC field, a PID field and an EOP field from the data stream.

19. The method as claimed in claim 15, wherein the counting step starts counting by detecting an NRXI-coded "0" from the data stream.

20. The method as claimed in claim 15, wherein counting step starts counting by detecting a transition from the "J" state to an NRXI-coded "0" in the data stream.

* * * * *